US012619890B2

(12) United States Patent　　　　(10) Patent No.:　US 12,619,890 B2
Ide et al.　　　　　　　　　　　　　(45) Date of Patent:　　　　May 5, 2026

(54) LEARNING PATTERN DICTIONARY FROM NOISY NUMERICAL DATA IN DISTRIBUTED NETWORKS

(71) Applicant: INTERNATIONAL BUSINESS MACHINES CORPORATION, Armonk, NY (US)

(72) Inventors: Tsuyoshi Ide, Harrison, NY (US); Rudy Raymond Harry Putra, Yokohama (JP); Dung Phan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 16/655,202

(22) Filed: Oct. 16, 2019

(65) Prior Publication Data

US 2021/0117829 A1　　Apr. 22, 2021

(51) Int. Cl.
　G06N 5/043　　　　(2023.01)
　G06N 7/01　　　　(2023.01)
　　　　　(Continued)
(52) U.S. Cl.
　CPC ............... G06N 5/043 (2013.01); G06N 7/01 (2023.01); G06N 20/00 (2019.01); H04L 9/0643 (2013.01)
(58) Field of Classification Search
　CPC .......... G06N 5/043; G06N 7/01; G06N 20/00; G06N 20/20; H04L 9/0643; H04L 9/50; H04L 9/3239
　See application file for complete search history.

(56) References Cited

U.S. PATENT DOCUMENTS 10,657,461 B2　5/2020　Mcmahan
11,461,690 B2　10/2022　Szeto
　　　　(Continued)

FOREIGN PATENT DOCUMENTS

CN　　107147683 A　　9/2017
CN　　107249046 A　　10/2017
　　　(Continued)

OTHER PUBLICATIONS

Lu, "Blockchain and Federated Learning for Privacy-Preserved Data Sharing in Industrial IoT") IEEE Transactions On Industrial Informatics Date of publication Sep. 18, 2019 (Year: 2019).*
(Continued)

*Primary Examiner* — Usmaan Saeed
*Assistant Examiner* — Su-Ting Chuang
(74) *Attorney, Agent, or Firm* — CHIP LAW GROUP

(57)　　　　ABSTRACT

A collaborative learning framework is presented. The collaborative framework is implemented by multiple network nodes interconnected by a network. The network nodes belong to multiple client systems of the framework. A network node belonging to a first client system constructs a predictive model for the first client system by using a pattern dictionary that is a built based on a consensus among the multiple client systems. The network node calculates a set of local statistics for the first client system based on raw data of the first client system. The network node computes a consensus set of local statistics by aggregating sets of local statistics from the multiple client systems. The network node updates the pattern dictionary based on current values of the pattern dictionary and the consensus set of local statistics.

19 Claims, 6 Drawing Sheets

(51) Int. Cl.
G06N 20/00 (2019.01)
H04L 9/06 (2006.01)

(56) References Cited

U.S. PATENT DOCUMENTS

| | | | |
|---|---|---|---|
| 11,954,592 | B2 | 4/2024 | Xu |
| 2013/0156300 | A1 | 6/2013 | Porikli |
| 2013/0159847 | A1 | 6/2013 | Banke |
| 2017/0032143 | A1 | 2/2017 | Kong |
| 2018/0121936 | A1 | 5/2018 | Madduri |
| 2018/0373988 | A1 | 12/2018 | Dhanyamraju |
| 2019/0012595 | A1 | 1/2019 | Beser |
| 2019/0050515 | A1 | 2/2019 | Su |
| 2019/0129895 | A1 | 5/2019 | Middleton |
| 2021/0034985 | A1 | 2/2021 | Vongkulbhisal et al. |

FOREIGN PATENT DOCUMENTS

| | | |
|---|---|---|
| CN | 107871160 A | 4/2018 |
| CN | 109284624 A | 1/2019 |
| CN | 109284625 A | 1/2019 |
| CN | 109698822 A | 4/2019 |
| CN | 109716346 A | 5/2019 |
| CN | 110197285 B | 3/2021 |
| CN | 114503505 A | 5/2022 |
| DE | 112020004161 T5 | 6/2022 |
| GB | 2604467 A | 9/2022 |
| JP | 2013037726 A | 2/2013 |
| JP | 2022-551917 A | 12/2022 |
| KR | 20190046148 A | 5/2019 |
| WO | 2021/074773 A1 | 4/2021 |

OTHER PUBLICATIONS

Mohri ("Agnostic federated learning") arXiv:1902.00146v1 [cs. LG] Feb. 1, 2019 (Year: 2019).*
Meguelati ("Dirichlet Process Mixture Models made Scalable and Effective by means of Massive Distribution") SAC '19, Apr. 8-12, 2019, Limassol, Cyprus (Year: 2019).*
Wu ("Distributed Modelling Approaches for Data Privacy Preserving") 2019 IEEE Fifth International Conference on Multimedia Big Data (BigMM) (Year: 2019).*
Verheul ("Polymorphic Encryption and Pseudonymisation for Personalised Healthcare") Institute for Computing and Information Sciences Radboud University Nijmegen, The Netherlands (Year: 2016).*

Hu ("Decentralized Federated Multi-Task Learning and System Design") Chaoyang He, Tian Xie, Zhengyu Yang, Zijian Hu, Shuai Xia May 3, 2019 https://www.zijianhu.com/project/dpa_sgd/ (Year: 2019).*
Nilsson ("A Performance Evaluation of Federated Learning Algorithms") DIDL '18, Dec. 10-11, 2018, Rennes, France (Year: 2018).*
Fung ("Mitigating Sybils in Federated Learning Poisoning") arXiv:1808. 04866v4 [cs.LG] May 16, 2019 (Year: 2019).*
Lyu ("Towards Fair and Privacy-Preserving Federated Deep Models") arXiv:1906.01167v1 [cs.CR] Jun. 4, 2019 (Year: 2019).*
Iyer ("Topological properties of random wireless networks") S̄adhan̄a vol. 31, Part 2, Apr. 2006, pp. 117-139. © Printed in India (Year: 2006).*
Chmielowiec ("Decentralized group formation" Oct. 9, 2014) Chmielowiec et al. Journal of Internet Services and Applications 2014, 5:12 http://www.jisajournal.com/content/5/1/12 (Year: 2014).*
Kim ("Efficient privacy-preserving machine learning for blockchain network" Sep. 9, 2019) Digital Object Identifier 10.1109/ACCESS. 2019.2940052 (Year: 2019).*
Yin ("Byzantine-Robust Distributed Learning: Towards Optimal Statistical Rates" Mar. 5, 2018) arXiv:1803.01498v1 [cs.LG] Mar. 5, 2018 (Year: 2018).*
Rathore ("BlockDeepNet: A Blockchain-Based Secure Deep Learning for IoT Network" Jul. 22, 2019) Sustainability 2019, 11, 3974; doi:10.3390/su11143974 (Year: 2019).*
Chen, J. et al., "Dictionary Learning over Distributed Models"; introarXiv:1402.1515v2 [cs.LG] Dec. 7, 2014, 16 pgs.
Raja, H. et al., "Cloud K-SVD: A Collaborative Dictionary Learning Algorithm for Big, Distributed Data"; arXiv:1412.7839v2 [cs.LG] Aug. 17, 2015; 16 pgs.
Ide, T. et al., "Collaborative Anomaly Detection on Blockchain from Noisy Sensor Data"; 2018 IEEE International Conference on Data Mining Workshops (ICDMW); 8 pgs.
English translation of Office Action issued May 8, 2024 in counterpart Japanese Patent Application No. 2022-521650, 4 pgs.
Office Action with English translation issued in related Chinese Application No. 202080066780.3, dated Jul. 18, 2024, 16 pgs.
The State Intellectual Property Office of People's Republic of China, " Notification of Grant," Oct. 22, 2024, 2 Pages, CN Application No. 202080066780.3.
International Searching Authority, "Notification of Transmittal of the International Search Report and the Written Opinion of the International Searching Authority, or Declaration," Patent Cooperation Treaty, Jan. 27, 2021, 8 pages, International Application No.-PCT/ IB2020/059571.

* cited by examiner

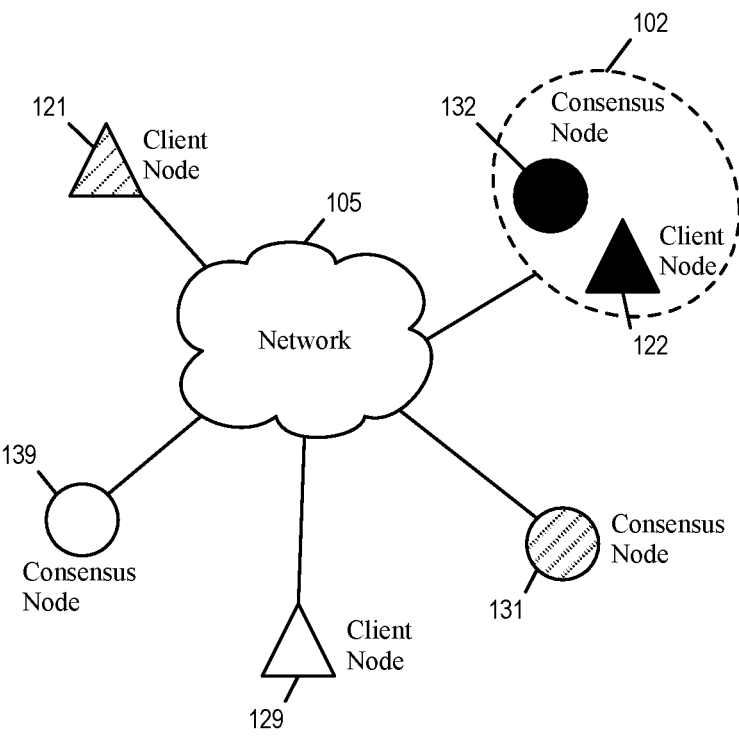
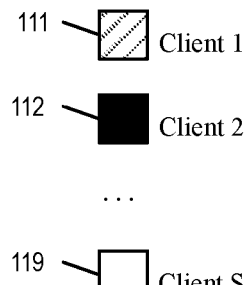
FIG. 1

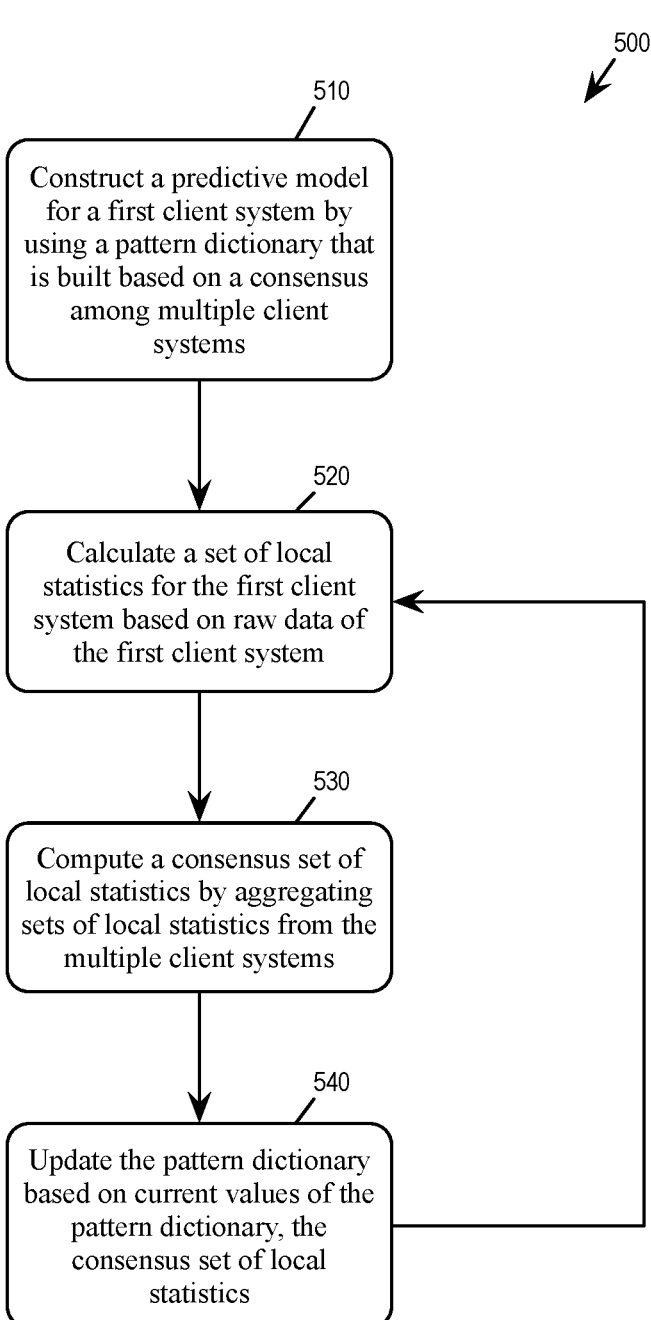

500

510

Construct a predictive model for a first client system by using a pattern dictionary that is built based on a consensus among multiple client systems

520

Calculate a set of local statistics for the first client system based on raw data of the first client system

530

Compute a consensus set of local statistics by aggregating sets of local statistics from the multiple client systems

540

Update the pattern dictionary based on current values of the pattern dictionary, the consensus set of local statistics

*FIG. 5*

LEARNING PATTERN DICTIONARY FROM NOISY NUMERICAL DATA IN DISTRIBUTED NETWORKS

BACKGROUND

Technical Field

The present disclosure generally relates to computation by decentralized networks.

Description of the Related Arts

The design principle of decentralized, secure, and transparent transaction management is casting a new light on machine learning algorithms, especially in the field of federated learning. Furthermore, the traditional notion of security is partly replaced with a stochastic approach in validating data consistency.

SUMMARY

Some embodiments of the disclosure provide a collaborative learning framework that is implemented by multiple network nodes interconnected by a network. The network nodes belong to multiple client systems of the framework. A network node belonging to a first client system constructs a predictive model for the first client system by using a pattern dictionary that is built based on a consensus among the multiple client systems. The network node calculates a set of local statistics for the first client system based on raw data of the first client system. The network node computes a consensus set of local statistics by aggregating sets of local statistics from the multiple client systems. The network node updates the pattern dictionary based on current values of the pattern dictionary and the consensus set of local statistics.

In some embodiments, the network node computes the consensus set of local statistics by distributing different subsets of the set of local statistics of the first client system to different network nodes belonging to different client systems. The different subsets of the set of local statistics of the first client system are distributed to network nodes that are identified based on a randomly generated incident matrix.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1 illustrates a decentralized system 100 that implements a collaborative learning framework, consistent with an exemplary embodiment.

FIG. 5 conceptually illustrates a process 500 for performing collaborative dictionary learning, consistent with an exemplary embodiment.

DETAILED DESCRIPTION

Figure 2:
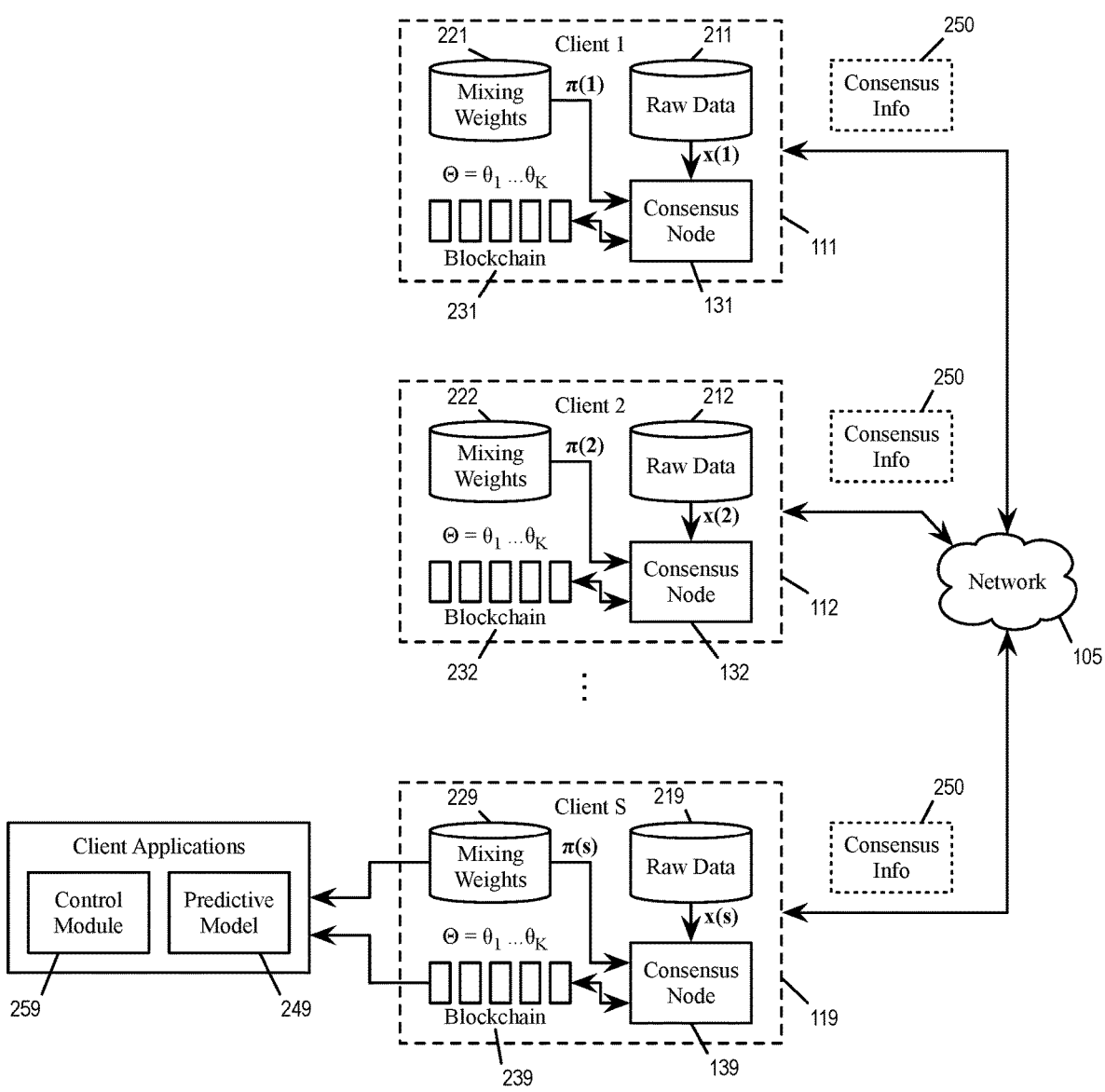
FIG. 2 illustrates consensus nodes of different client systems perform collaborative dictionary learning, consistent with an exemplary embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Collaborative learning with IoT (Internet-of-Things) devices is one of the applications of distributed learning. The statistical nature of IoT data is different from transaction data among financial entities, being mostly noisy multivariate real-valued data. Real-valued data may be too low-level to be protected with existing cryptographic technologies. In addition, security requirements of IoT data are different from that of money transfer. For many IoT applications, high-level statistics such as a production yield are often of more interest, rather than the exact values of individual data samples.

Some embodiments of the disclosure provide a framework for collaborative learning in a decentralized multitasking environment. The framework performs collaborative learning in three steps: local updates, consensus building, and optimization. A computing device implementing a client system of the collaborative learning framework is able to achieve consensus building and data privacy without the computational overhead of encryption-based multiparty computation, especially for transactions involving a large amount of low-level sensor data from IoT devices. In this way, the computing device implementing the client system discussed herein, uses less computational resources, including computational cycles, memory.

The collaborative learning framework can be used for collaborative anomaly detection of industrial assets owned by different companies. The collaborative learning framework allows each client system to learn S anomaly detection models customized to each asset based on secure collaborative efforts. Other examples of using the collaborative learning framework include: collaborative disease or symptom analysis based on biomarkers collected by various medical institutions; collaborative anti-money-laundering model based on transaction data from various financial entities; and battery life prediction based on battery sensor data from different electric vehicles.

For some embodiments, FIG. 1 illustrates a decentralized system 100 that implements a collaborative learning framework, consistent with an embodiment of the disclosure. As illustrated, the decentralized system 100 is implemented over a network 105 interconnecting S client systems, including client systems 111-119 (client systems 113-118 not illustrated). Each client system may belong to a company, a financial institution, a government agency, a private home, or other types of entities that may be interested in utilizing useful information from other client systems. Each client system or company wishes to improve its own prediction model by utilizing data owned by the other client systems but does not want to share its own data with its competitors or outside entities.

Each client system employs one or more computing devices, including computing devices that are connected to the network 105. The administrator of the network 105 is expected to perform bookkeeping jobs such as managing communications paths, clock synchronization, etc. The administrator of the network 105 is not allowed to see raw data of the clients. Each client system includes one or more computing devices that are connected to the network 105 as network nodes. The network nodes of a client system may include a client node and a consensus node that are partners. As illustrated, the client system 111 has a client node 121 and a consensus node 131, the client system 112 has a client node 122 and a consensus node 132, and the client system 119 has a client node 129 and a consensus node 139. Consensus nodes are network nodes of the network 105. In some embodiments, some or all client nodes are not network nodes of the network work 105 and are not directly connected to the network 105.

A client node is an owner of local data of a client system by e.g., being connected to a database of the client system. A client node of a client system may behave as the manager of a network node (e.g., a consensus node) of the client system. In some embodiments, multiple client nodes may be connected to a consensus node. A client node communicates with only a pre-selected, trusted partner consensus node (e.g., the consensus node of the same client system). A consensus node communicates with other consensus nodes to build consensus (in the form of a pattern dictionary). For example, the client node 121 is the owner of local data of the client system 111 and transmits and receives data belonging to the client system 111. The consensus node 131 is the trusted partner consensus node of the client node 121 and receive statistics from the client node 121. The consensus node 131 communicates with consensus nodes belonging to other client systems, including the consensus node 132 of the client system 112 and the consensus node 139 of the client system 119.

A client node and its partner consensus node may be implemented on a same computing device. For example, the client node 122 and the consensus node 132 of the client system 112 are implemented by a same computing device 102. A client node and its partner consensus node may also be implemented by different computing devices. The two computing devices implementing the client node and the consensus node may be connected by a private connection within the client system. The two computing devices may also be in different physical locations and are interconnected by the network 105. In some embodiments, the network traffic between a client node and its partner consensus node of a client system may be encrypted according to the client's privacy requirement, while the network traffic among consensus nodes of different client systems are not encrypted. In some embodiments, client nodes are not connected to the network in order to avoid leakage of client raw data from the client system.

FIG. 2 illustrates consensus nodes of different client systems perform collaborative dictionary learning, consistent with an embodiment of the disclosure. The consensus nodes of different client systems communicates with each other to collaboratively build a pattern dictionary that can be used by each client system to build a predictive model. The figure illustrates the operations of the consensus node 139 for the client system 119 (client S). The consensus node 139 receives client-specific data from the partner client node 129 (not illustrated) of the client system 119. The consensus node 139 communicates with other consensus nodes of other client systems (e.g., the consensus node 131 of client 1 and the consensus node 132 of client 2) over the network 105 to collaboratively construct and update a pattern dictionary, which is stored in a blockchain 239.

In some embodiments, a computing device implementing the client system 119 implements the consensus node 139 and the blockchain 239. In some embodiments, the consensus node 139 and the blockchain 239 are modules of software instructions being executed by one or more processing units (e.g., a processor) of the computing device 105. In some embodiments, the consensus node 139 and the blockchain 239 are modules of hardware circuits implemented by one or more integrated circuits (ICs) of an electronic apparatus. An example computing device 600 that may implement the client system 119 will be described by reference to FIG. 6 below.

The consensus node 139 generates the update for the pattern dictionary $\Theta$ (stored in the blockchain 239) based on raw data 219 ($x^s$), the mixing weights 229 ($\pi^s$), and the current content of the pattern dictionary 239, along with consensus information 250 being exchanged with other consensus nodes through the network 105. The raw data 219 and the mixing weight 229 are information specific or proprietary to the client system 119 (client S). The pattern dictionary 239 stores the result of collaborative learning by the different consensus nodes of the different client systems. The content of the blockchain 239 (pattern dictionary $\Theta$) is a consensus among the different client systems. The pattern dictionary $\Theta$ includes K model parameters or words $\{\theta_1, \ldots, \theta_K\}$, where each word corresponds to a mixture component that is used to compute a predictive model 249. The client system 119 mixes the corresponding components the pattern dictionary 239, the raw data 219, and the mixing weights 229 to generate a predictive model 249 for the client system 119. The predictive model 249 is used by applications of the client system, such as to provide stimulus to a control module 259. In some embodiments, the applications of the client system 119, including the predictive model 249 and the control module 259 are not connected to the network 105 in order to avoid leakage or client rawdata.

The raw data 219 ($x^s$) is data, statistics, or measurement that are specific or proprietary to the client system 119 (client S) and not to be shared with other client systems. In some embodiments, each client privately holds its own raw data in a database. For some embodiments, the raw data 219 may include noisy multivariate real-valued data, such as measurements or sensor data generated by IoT devices owned by the client system 119. In some embodiments, the raw data 219 is provided to the consensus node 139 by its partner client node through the network 105.

The mixing weight 229 (πs) is used to determine how much weight is given to the word or mixture components of the pattern dictionary 239. The mixing weights $$\{\pi_1^S, \dots \pi_K^S\}$$

are respectively applied to the mixture components of the pattern dictionary $\{\theta_1, \dots \theta_K\}$ when mixing with private raw data 219 ($x^S$) to determine the predictive model $P^s$ for client system S (the client system 119).

The pattern dictionary 239 is a blockchain structure that stores the words or mixture components $\{\theta_1, \dots, \theta_K\}$ of the pattern dictionary $\Theta$. The blockchain is an immutable record that can be used for auditing, pricing, evaluation, etc. Outcomes of secure collaborative learning are stored in blockchain at each client system. The blockchains of the different client systems (blockchains 231-239 of client systems 111-119) have the same contents based on the consensus-building algorithm. In some embodiments, when one iteration or round of the consensus building algorithm finishes, a new block is appended to the blockchains. Each block contains an updated agreed-on pattern dictionary. The learned dictionary contains a set of model parameter vectors as words $\{\theta_1, \dots, \theta_K\}$, each word is a multivariate real value. When convergence criteria are met, the pattern dictionary stops updating and the blockchain is "locked". The final dictionary words are stored in the last block of the blockchains.

The client systems s=1, ... S privately have their own raw data, such that:

$$D^s = \{x^{s(n)} | n=1, \dots, N^s; x^{s(n)} \in \mathbb{R}^M\} \tag{1}$$

Where:
N^s is the number of samples of the s-th client, and
M is the dimensionality of the data, which is assumed to be common across all client systems.

The predictive model for a client system S is a probability distribution $p^s$ that is determined according to:

$$p^s(x^s | \Theta, \pi^s) = \sum_{k=1}^K \pi_k^s f(x^S | \theta_K) \tag{2}$$

Where:
$\{\theta_1, \dots \theta_K\}$ are mixture components of the pattern dictionary, while $$\{\pi_1^S, \dots \pi_k^S\}$$

are the respective mixing weights of the mixing components for the client system s;
Uppercase K is the number of the patterns in the pattern dictionary;
Lowercase k is the index of a pattern in the pattern dictionary;
Uppercase S is the number of entities in the network; and
Lowercase s is the index of a client in the network.

A computing device at a client system s may make a determination and/or trigger a corresponding action based on the collaboratively determined predictive distributions $p^s$ according to (2). For example, the collaborative learning system may be used to detect an anomaly based on sensor data from industrial assets of various companies. In some embodiments, an anomaly score may be computed as a negative log likelihood according to:

$$(\text{anomaly score}) = -\ln\ p^s(x_{new}^s | \Theta, \pi^s) \tag{8}$$

Where $$x_{new}^s$$

is the new measurement taken at client system s.

For some embodiments, the problem of collaborative dictionary learning can be formalized as a collaborative density estimation of mixtures of exponential family. Based on the exponential family, the collaborative learning framework performs collaborative dictionary learning in three steps: local updates, consensus building, and optimization.

The exponential family for the probability density is expressed as:

$$f(x^s | \theta_k) = G(\theta_k) H(x^s) \exp\{\eta(\theta_k)^\tau T(x^s)\} \tag{4}$$

Where:
$\tau$ is the vector (or matrix) transpose;
H(.), G(.) are scalar functions; and
$\eta(.), T(.)$ are (column) vector functions satisfying required mathematical properties as a probability distribution function.

$T(x^s)$ in particular is a sufficient statistic based on raw data $x^s$ of the client s. A statistic is sufficient for a family of probability distribution (e.g., an exponential family) if the sample from which it is calculated gives no additional information than does the statistic, as to which of those probability distributions is that of the population from which the sample was taken. Based on equation (4), the dictionary words $\{\theta_k\}$ can be found by maximizing the following:

$$\sum_{k=1}^K \left[ \ln p(\theta^k) + \sum_{s=1}^S \{N_k^s \ln G(\theta_k) + T_k^{s^\top} \eta(\theta_k)\} \right], \tag{5}$$

In equation 5, all the terms independent of $\Theta$ are dropped.

$$T_k^s$$

is a set of local sufficient statistics based on the raw data of the client system s for mixture component k.

$$N_k^s$$

is a sample size for the client system s for mixture component k. $N_s$ is a overall sample size of all mixture components at a client system s. For example, the collaborative learning system may be used to detect irregularities by different financial institutions (as different client systems), $N^s$ represent the total number of accounts at a particular bank, and $$N_k^s$$

represents number of accounts at the particular bank having a particular characteristic (e.g., accounts having fund over one million).

$$N_k^s$$

and $$T_k^s$$

of the different client systems are aggregated into consensus set of sample sizes $N_k$ and consensus set of sufficient statistics $T_k$ according to the following:

$$N_k = \sum_{s=1}^{S} N_k^s, \; T_k = \sum_{s=1}^{S} T_k^s, \tag{6}$$

Hence, the dictionary words $\{\theta_k\}$ can be found by maximizing expression (5) according to the following:

$$\theta_k = \arg \max_{\theta_k} \{\ln p(\theta^k) + N_k \ln G(\theta_k) + T_k^\top \eta(\theta_k)\}, \tag{7}$$

Since all terms of Eq. (7) are already available to the client system, Eq. (7) can be evaluated without any communication among the client systems. Formalizing collaborative learning as an exponential family allows collaborative learning to be performed in three distinct steps: (i) Local Updates, (ii) Consensus, and (iii) Optimization. During the Local Update step, the client system determines $$N_k^s$$

and $$T_k^s,$$

which can be entirely determined at the client system s without communications with other client systems. During the Consensus step, the client system s communicates with consensus nodes of other client systems based on equation (6) to compute the aggregated consensus $N_k$ and $T_k$. During the optimization step, the client system compute $\theta_k$ based on Eq. (7), which can be performed entirely within the client system based on aggregated $N_k$ and $T_k$ without communicating with other consensus nodes.

Figures 3A, 3B, 3C:
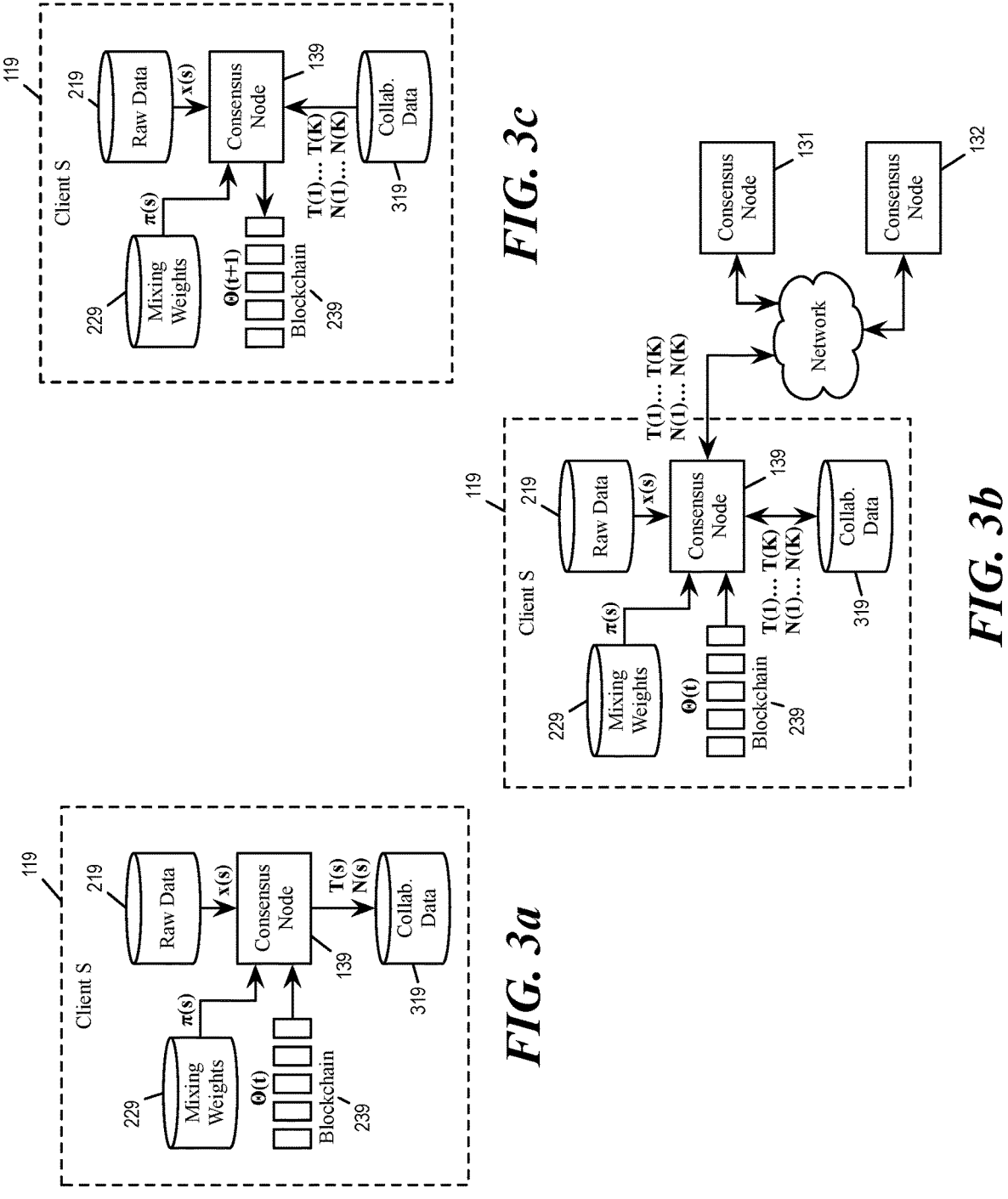
FIGS. 3a-c illustrate a consensus node of a client system performing collaborative dictionary learning.
Figure 4A:
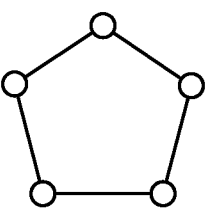
FIG. 4a-h illustrates examples of cyclic graphs that are used as an incident matrix for a consensus node.
Figure 4B:
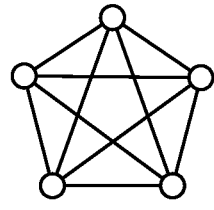
Figure 4C:
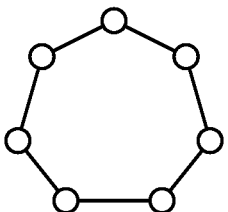
Figure 4D:
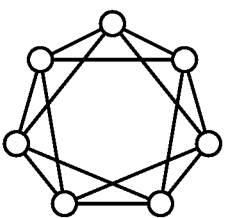
Figure 4E:
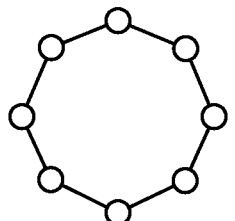
Figure 4F:
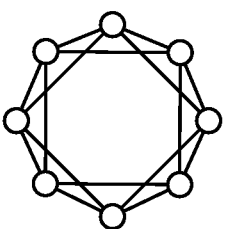
Figure 4G:
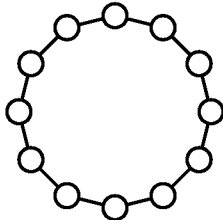
Figure 4H:
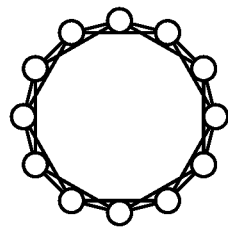

FIGS. 3a-c illustrate a consensus node of a client system performing collaborative dictionary learning. Specifically, the figures illustrate the consensus node 139 of the client system 119 performing the steps of local update, consensus building, and optimization to update the content of pattern dictionary 239 by determining the parameters of the exponential family (e.g., the aggregated sufficient statistics $T_k$ and the aggregated sample size $N_k$) and by communicating with other consensus nodes through the network 105.

FIG. 3a illustrates the local update step of the collaborative dictionary learning. As illustrated, the consensus node

139 receives mixing weights 229 and raw data 219 of the client system 119 (e.g., from the partner client node). The consensus node 139 in turn computes local update for the sufficient statistics $$T_k^s$$

and sample size $$N_k^s$$

for the client system 119 (clients) based on the raw data 219. The consensus node does not use information from other client systems in this operation. The computed/updated sufficient statistics $$T_k^s$$

and sample size $$N_k^s$$

are stored locally in the client system 119 as collaboration data 319.

In some embodiments, the consensus node computes sample weights $$r_k^{s(n)} \text{ and } N_k^s$$

based on $$\pi_k^s$$

(the mixing weights 229) according to:

$$r_k^{s(n)} = \frac{\pi_k^s f(x^{s(n)} \mid \theta_k)}{\sum_{m=1}^{K} \pi_m^s f(x^{s(n)} \mid \theta_m)} \tag{8}$$

$$N_k^s = \sum_{n=1}^{N^S} r_k^{s(n)} \tag{9}$$

Where $$r_k^{s(n)}$$

is the sample weight of the n-th sample of the k-th mixture component of the client s.

In some embodiments, the sufficient statistics $$T_k^s$$

of a mixture component k at a client system s may be defined as:

$$T_k^s \equiv \sum_{n=1}^{N^s} r_k^{s(n)} T\left(x^{s(n)}\right) \qquad (10)$$

FIG. 3*b* illustrates the consensus building step of the collaborative dictionary learning. As illustrated, the consensus node 139 communicates with consensus nodes of other client systems over the network 105 to obtain $$T_k^s \text{ and } N_k^s$$

values of other client systems and to transmits the local $$T_k^s \text{ and } N_k^s$$

values (from the collaboration data 319) to the consensus nodes of other client system. The consensus node 139 then aggregates the $$T_k^s \text{ and } N_k^s$$

values of the different client systems into the consensus sufficient statistics $T_k$ and the consensus sample size $N_k$ for different mixture components (e.g., by using equations (6)). The consensus sufficient statistics $T_k$ and the consensus sample size $N_k$ are also stored as the collaboration data 319.

FIG. 3*c* illustrates the optimization step of the collaborative dictionary learning. In this operation, the consensus node 139 uses the consensus sufficient statistics $T_k$ and the consensus sample size $N_k$ to determine the updated content of the pattern dictionary $\theta_k$ for different mixture components, to be stored in the blockchain 239. Since $T_k$ and $N_k$ were aggregated at the consensus node 139 (stored as collaboration data 319), they are already available to the consensus node 139 without communicating with other client systems.

In some embodiments, the summations of Eq. (6) for $T_k$ and $N_k$ can be performed element-wise, and can be generalized as a sum of scalars:

$$\bar{\xi} = \sum_{s=1}^{S} \xi^s = 1_S^T \xi(0), \qquad (11)$$

Where:

$\xi^s$ is a set of local statistics for the client system s (e.g., the sufficient statistics $$T_k^s$$

or the sample size $$N_k^s);$$

and $\xi$ is the consensus set of local statistics aggregated from different client systems.

In some embodiments, the communications path between the consensus nodes of different client systems is restricted based on a connected graph A. The connected graph A is also referred to as an incident matrix, in which '1' indicates that an edge or path exist and '0' indicates an edge or path does not exist. In each consensus node of a client system, the set of local statistics $\xi^s$ is iteratively updated according to $$\xi^s \leftarrow \xi^s + \epsilon \sum_{j=1}^{S} A_{s,j}\left(\xi^j - \xi^s\right) \qquad (12)$$

Where $\epsilon$ is a parameter controlling convergence.

In some embodiments, $\epsilon$ is chosen based on the incident matrix A to be $\epsilon = 1/d_{max}$, where $d_{max}$ is the maximum node degree or number of incident edges of a consensus node. In some embodiments, in order to protect data privacy, the set of local statistics $\xi^s$ of the client system s can be split into $N^c$ chunks $\{\xi^{s[1]}, \ldots \xi^{s[N^c]}\}$, such that:

$$\xi \rightarrow \frac{1}{S}\sum_{s=1}^{S} \xi^s = \frac{1}{S}\sum_{s=1}^{S}\left(\xi^{s[1]} + \xi^{s[2]} + \ldots + \xi^{s[N^c]}\right) = \qquad (13)$$

$$\frac{1}{S}\sum_{s=1}^{S} \xi^{s[1]} + \ldots + \frac{1}{S}\sum_{s=1}^{S} \xi^{s[N^c]}$$

The client system s may determine how to split $\xi^s$ into $N^c$ chunks or subsets. In some embodiments, during each iteration of the consensus building step of FIG. 3*b*, the consensus node 119 randomly generates the incident matrix and distributes the chunks or subsets of the set of local statistics to the consensus nodes of other client systems based on the randomly generated incident matrix. Stochastically distributing the subsets of the local statistics to other consensus nodes during consensus building enhances the security of the client system because other client systems are not able to reconstruct the private raw data.

Even $N_c = 2$ may be suffice to secure privacy if the incident matrix A is non-overlapping and the router always chooses an A that is different than the previous iteration of consensus building and chunking local statistics. Even when it is not possible to generate multiple incident matrices that are non-overlapping, (which may happen when A is dense or when the router cannot keep the memory of a previously used A), the probability of privacy breach $p_b$ is upper bounded as $$p_b \leq S(S-1)\left(\frac{d_{max}}{S-1}\right)^{N_c} \qquad (14)$$

where $d_{max}$ is the maximum degree of the incident matrix A. As long as A is sparse and thus $d_{max}$ is much smaller than S, $p_b$ can be made arbitrarily small by choosing sufficiently large $N_c$.

In some embodiments, in order to ensure equality among the different consensus nodes, cyclic graphs that are regular and sparse are used as incident matrix. FIGS. 4*a-h* illustrate examples of cyclic graphs that are used as incident matrix for a consensus node. In the figure, each vertex represents a consensus node and each edge represent a communication pathway that can be used by the consensus node to deliver a subset of its local statistics for building consensus.

In some embodiments, in order to improve convergence speed, an expander graph is used as the incident matrix for distributing subsets of local statistics. Specifically, for each consensus node s=1, . . . S, the expander graph based incident matrix provide an edge to a consensus node s−1, s+1, and j, where j is the solution of (s−1)(j−1) mod S=1. Using expander graph suggests ~log(S) iterations to achieve a given precision.

FIG. 5 conceptually illustrates a process 500 for performing collaborative dictionary learning, consistent with an exemplary embodiment. The collaborative learning is performed by multiple network nodes interconnected by a network belonging to multiple different client systems of a collaborative learning framework. In some embodiments, one or more processing units (e.g., processor) of a computing device implementing a network node of a client system (e.g., the consensus node 139 of the client system 119) perform the process 500 by executing instructions stored in a computer readable medium.

The network node constructs (at 510) a predictive model for a first client system by using a pattern dictionary that is built based on a consensus among the multiple client systems. The pattern dictionary may be stored in a hash-chain data structure. The predictive model of the first client system may be a probability distribution ($p^s$) determined based raw data of the first client system ($x^s$), a set of mixing weights ($\pi^s$) of the first client system, and current values of the pattern dictionary ($\Theta$). The raw data may include noisy, real number values generated by one or more Internet of Things (IoT) devices. In some embodiments, the first network node is a consensus node of the first client system, and the raw data of the first client system is received from a client node of the first client system with encryption.

The network node calculates (at 520) a set of local statistics ($\xi^s$) for the first client system based on the raw data of the first client system. The set of local statistics may include a set of sufficient statistics ($T^S$) and a set of sample sizes ($N^S$). The network node may update the set of sample sizes for the first client system based on a set of sample weights of the first client system. In some embodiments, the network nodes also updates a set of sample weights ($r^{s(n)}$) of the first client system based on the raw data of the first client system and the pattern dictionary, and the set of sample sizes ($N^S$) is determined based on the sample weights. In some embodiments, the pattern dictionary, the set of local statistics, the set of sample sizes, the set of sample weights, and the set of mixing weights each includes components $$(\theta_k, T_k^s, N_k^s, r_k^{s(n)}, \pi_k^s, \text{ for } k = 1 \dots K)$$

that correspond to a set of mixture components, respectively.

The network node computes (at 530) a consensus set of local statistics ($\xi$) by aggregating sets of local statistics ($\xi^s$) from the multiple client systems, e.g., by computing a consensus set of sufficient statistics ($T_k$) by aggregating sets of sufficient statistics $$(T_k^s)$$

and/or by computing a consensus set of sample sizes ($N_k$) by aggregating sets of sample sizes $$(N_k^s)$$

from the multiple client systems. In some embodiments, the network node computes the consensus set of local statistics by distributing different subsets of the set of local statistics for the first client system to different network nodes belonging to different client systems. In some embodiments, the different subsets of the set of sufficient statistics of the first client system are distributed to network nodes that are identified based on a randomly generated incident matrix.

The network node updates (at 540) the pattern dictionary ($\Theta$) based on current values of the pattern dictionary and the consensus set of local statistics ($\xi$). In some embodiments, the network node may return to 520 to compute the next iteration of local update, consensus building, and optimization. The process 500 may end when the convergence or consensus is achieved, for example, when the local statistics of different client systems have the same value or within a threshold value of each other.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 5) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
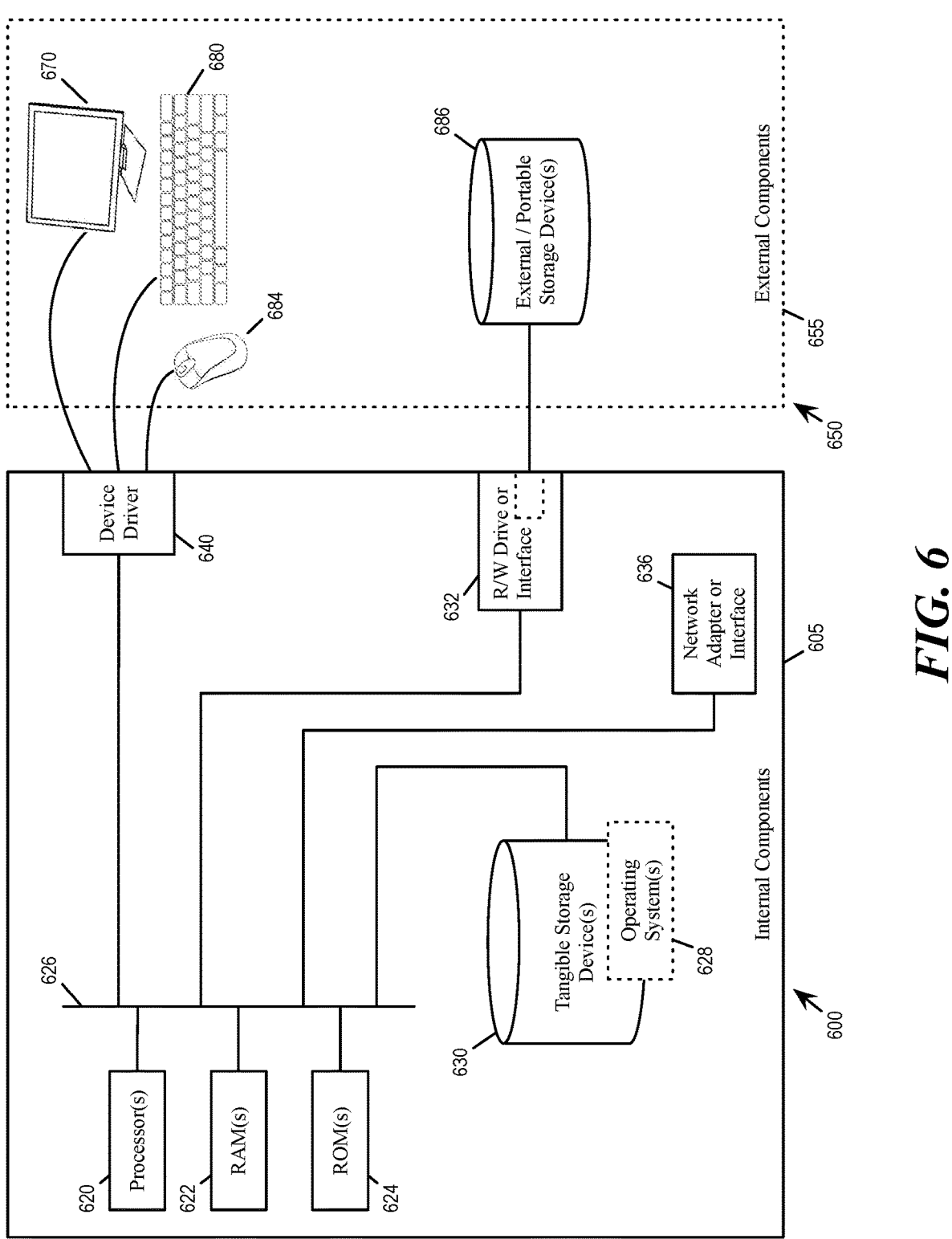
FIG. 6 shows a block diagram of the components of a data processing system in accordance with an illustrative embodiment.

FIG. 6 shows a block diagram of the components of data processing systems 600 and 650 that may be used to implement a client system or a consensus node in a collaborative learning framework in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing systems 600 and 650 are representative of any electronic device capable of executing machine-readable program instructions. Data processing systems 600 and 650 may be representative of a smart phone, a computer system, PDA, or other electronic devices. Examples of computing systems, environments, and/or configurations that may represented by data processing systems 600 and 650 include, but are not limited to, personal computer systems, server computer systems, thin client, thick client, hand-held or laptop devices, multiprocessor systems, microprocessor-based systems, network PCs, minicomputer systems, and distributed cloud computing environments that include any of the above systems or devices.

The data processing systems 600 and 650 may include a set of internal components 605 and a set of external components 655 illustrated in FIG. 6. The set of internal components 605 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628 and programs such as the programs for executing the process 500 are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 605 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the process 500 can be stored on one or more of the respective portable computer-readable tangible storage devices 686, read via the respective R/W drive or interface 632 and loaded into the respective hard drive 630.

The set of internal components 605 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 655 can include a computer display monitor 670, a keyboard 680, and a computer mouse 684. The set of external components 655 can also include touch screens, virtual keyboards, touch pads, pointing devices, and other human interface devices. The set of internal components 605 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

The foregoing one or more embodiments implements a client system or a network node of a collaborative learning framework within a computer infrastructure by having one or more computing devices updating local statistics. The computing devices also exchange the updated local statistics over a network with other client systems or network nodes to build consensus in the form of a pattern dictionary stored in blockchain. The computing devices also divides the updated local statistics into subsets and stochastically distributed the subsets to other computing devices.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for collaborative learning in a decentralized multitasking environment by a plurality of network nodes interconnected by a network, the plurality of network nodes belonging to a plurality of client systems, the computer-implemented method comprising:

constructing, at a first network node, of the plurality of network nodes, belonging to a first client system of the plurality of client systems of the decentralized multitasking environment, a predictive model for the first client system by using a pattern dictionary that is built based on a consensus building among the plurality of client systems;

calculating a set of local statistics of the first client system based on raw data of the first client system;

enhancing security of the first client system by:

splitting the set of local statistics of the first client system into subsets; and stochastically distributing the subsets to network nodes of the plurality of network nodes during the consensus building, wherein the network nodes belong to a set of client systems of the plurality of client systems, wherein the set of client systems is exclusive of the first client system, and wherein the network nodes are exclusive of the first network node;

computing a consensus set of local statistics by aggregating sets of local statistics from the plurality of client systems, wherein the sets of local statistics include the set of local statistics, and wherein each client system of the plurality of client systems corresponds to a respective set of local statistics of the sets of local statistics;

identifying an irregularity in the first client system using the consensus set of the local statistics;

iteratively updating the pattern dictionary based on current values of the pattern dictionary and the consensus set of local statistics, wherein the iterative updating terminates in a case where the sets of local statistics of client systems of the plurality of client systems have a same value or are within a threshold value, wherein each of the construction, the calculation, the computation, and the iterative updating is without a centralized control and operative to conserve computational resources, and wherein the pattern dictionary of the first client system is a local blockchain structure that stores words or a mixture of components; and storing an outcome of the collaborative learning at each local blockchain structure of each client system of the plurality of client systems.

2. The computer-implemented method of claim 1, wherein the predictive model of the first client system is a probability distribution determined based on the raw data of the first client system, a set of mixing weights of the first client system, and the pattern dictionary.

3. The computer-implemented method of claim 2, wherein each of the pattern dictionary, the set of local statistics, and the set of mixing weights comprises components that correspond to the mixture of components, respectively.

4. The computer-implemented method of claim 1, wherein the pattern dictionary is stored in a hash-chain data structure.

5. The computer-implemented method of claim 1, wherein the set of local statistics comprises a set of sufficient statistics of the raw data of the first client system and a set of sample sizes of the raw data of the first client system.

6. The computer-implemented method of claim 1, wherein the raw data comprises real number values generated by one or more Internet of Things (IoT) devices.

7. The computer-implemented method of claim 1, wherein the aggregating of the sets of local statistics from the plurality of client systems comprises exchanging the set of local statistics over the network among the plurality of network nodes without encryption.

8. The computer-implemented method of claim 1, wherein the first network node is a consensus node of the first client system, and wherein the raw data of the first client system is received from a client node of the first client system with encryption.

9. The computer-implemented method of claim 5, further comprising:

updating a set of sample weights of the first client system based on the raw data of the first client system and the pattern dictionary; and determining the set of sample sizes based on a sample weight of the set of samples weights.

10. The computer-implemented method of claim 1, wherein the subsets of the set of local statistics of the first client system are stochastically distributed to the network nodes that are identified based on a randomly generated incident matrix.

11. A computing device implementing a network node in a plurality of network nodes interconnected by a network, the plurality of network nodes belonging to a plurality of client systems in a collaborative decentralized multitasking learning framework, the computing device comprising:

a processor; and a storage device storing a set of instructions, wherein an execution of the set of instructions by the processor configures the computing device to perform operations comprising:

constructing, at a first network node, of the plurality of network nodes, belonging to a first client system of the plurality of client systems of the decentralized multitasking learning framework, a predictive model for the first client system by using a pattern diction-ary that is built based on a consensus building among the plurality of client systems;

calculating a set of local statistics of the first client system based on raw data of the first client system;

enhancing security of the first client system by:

splitting the set of local statistics of the first client system into subsets; and stochastically distributing the subsets to network nodes of the plurality of network nodes during the consensus building, wherein the network nodes belong to a set of client systems of the plurality of client systems, wherein the set of client systems is exclusive of the first client system, and wherein the network nodes are exclusive of the first net-work node;

computing a consensus set of local statistics by aggre-gating sets of local statistics from the plurality of client systems, wherein the sets of local statistics include the set of local statistics, and wherein each client system of the plurality of client systems cor-responds to a respective set of local statistics of the sets of local statistics;

identifying an irregularity in the first client system using the consensus set of the local statistics;

iteratively updating the pattern dictionary based on current values of the pattern dictionary and the consensus set of local statistics, wherein the iterative updating terminates in a case where the sets of local statistics of client systems of the plurality of client systems have a same value or are within a threshold value, wherein each of the construction, the calculation, the computation, and the iterative updating is without a centralized control, and wherein the pattern dictionary of the first client system is a local blockchain structure that stores words or a mixture of components; and storing an outcome of the collaborative learning at each local blockchain structure of each client system of the plurality of client systems.

12. The computing device of claim 11, wherein the predictive model of the first client system is a probability distribution determined based on the raw data of the first client system, a set of mixing weights of the first client system, and the pattern dictionary.

13. The computing device of claim 11, wherein the pattern dictionary is stored in a hash-chain data structure.

14. The computing device of claim 11, wherein the set of local statistics comprises a set of sufficient statistics of the raw data of the first client system and a set of sample sizes of the raw data of the first client system.

15. The computing device of claim 11, wherein the aggregating of the sets of local statistics from the plurality of client systems comprises exchanging the set of local statistics over the network among the plurality of network nodes without encryption.

16. The computing device of claim 11, wherein the subsets of the set of local statistics of the first client system are stochastically distributed to the network nodes that are identified based on a randomly generated incident matrix.

17. A computer program product implementing a network node in a plurality of network nodes interconnected by a network, the plurality of network nodes belonging to a plurality of client systems in a decentralized multitasking collaborative learning framework, the computer program product comprising:

one or more non-transitory computer-readable storage devices and program instructions stored on at least one of the one or more non-transitory computer-readable storage devices, the program instructions executable by a processor, the program instructions comprising sets of instructions for:

constructing, at a first network node, of the plurality of network nodes, belonging to a first client system of the plurality of client systems of the decentralized multitasking collaborative learning framework, a predictive model for the first client system by using a pattern dictionary that is built based on a consensus among the plurality of client systems;

calculating a set of local statistics of the first client system based on raw data of the first client system;

enhancing security of the first client system by:

splitting the set of local statistics of the first client system into subsets; and stochastically distributing the subsets to network nodes of the plurality of network nodes during the consensus building, wherein the network nodes belong to a set of client systems of the plurality of client systems, wherein the set of client systems is exclusive of the first client system, and wherein the network nodes are exclusive of the first net-work node;

computing a consensus set of local statistics by aggre-gating sets of local statistics from the plurality of client systems, wherein the sets of local statistics include the set of local statistics, and wherein each client system of the plurality of client systems cor-responds to a respective set of local statistics of the sets of local statistics;

identifying an irregularity in the first client system using the consensus of the local statistics;

iteratively updating the pattern dictionary based on current values of the pattern dictionary and the consensus set of local statistics, wherein the iterative updating terminates in a case where the sets of local statistics of client systems of the plurality of client systems have a same value or are within a threshold value, wherein each of the construction, the calculation, the computation, and the iterative updating is without a centralized control, and wherein the pattern dictionary of the first client system is a local blockchain structure that stores words or a mixture of components; and storing an outcome of a collaborative learning at each local blockchain structure of each client system of the plurality of client systems.

18. The computer program product of claim 17, wherein the aggregating of the sets of local statistics from the plurality of client systems comprises exchanging the set of local statistics over the network among the plurality of network nodes without encryption.

19. The computer program product of claim 17, wherein the subsets of the set of local statistics of the first client system are stochastically distributed to the network nodes that are identified based on a randomly generated incident matrix.

* * * * *